United States Patent [19]

Crass

[11] Patent Number: 5,200,123

[45] Date of Patent: Apr. 6, 1993

[54] PROCESS FOR PRODUCING ULTRA THIN THERMOPLASTIC FILMS

[75] Inventor: Guenther Crass, Taunusstein, Fed. Rep. of Germany

[73] Assignee: Hoechst Aktiengesellschaft, Frankfurt am Main, Fed. Rep. of Germany

[21] Appl. No.: 761,194

[22] Filed: Sep. 16, 1991

[30] Foreign Application Priority Data

Oct. 17, 1990 [DE] Fed. Rep. of Germany ....... 4032907

[51] Int. Cl.$^5$ ...................... B29C 55/14; B29C 65/04
[52] U.S. Cl. .................................. 264/22; 156/272.6; 156/273.3; 156/274.4; 156/344; 156/379.8; 264/171; 264/290.2; 427/536; 425/174.8 E
[58] Field of Search ................. 264/22, 82, 83, 290.2, 264/171, 334; 427/37, 39–41; 156/272.6, 274.4, 229, 344, 273.3, 379.6, 379.8; 29/25.42; 425/174.8 R, 174.8 E

[56] References Cited

U.S. PATENT DOCUMENTS

| | | | |
|---|---|---|---|
| T888,001 | 7/1971 | Drake, Jr. | 156/272.6 |
| 3,081,214 | 3/1963 | Strome | 156/272.6 |
| 3,391,044 | 7/1968 | Kaghan et al. | 156/272.6 |
| 3,454,461 | 7/1969 | Paxton . | |
| 3,944,895 | 3/1976 | Williams | 29/25.42 |
| 4,017,227 | 4/1977 | Schmidt | 425/66 |
| 4,076,785 | 2/1978 | Schmidt | 264/146 |
| 4,096,013 | 6/1978 | Lutzmann et al. | 156/272.6 |
| 4,415,394 | 11/1983 | Cholmar | 156/379.8 |
| 4,708,905 | 11/1987 | Yoshii et al. | 428/216 |
| 4,720,420 | 1/1988 | Crass et al. | 156/229 |
| 4,756,064 | 7/1988 | Yoshii et al. | 29/25.42 |
| 4,778,557 | 10/1988 | Schirmer | 156/272.6 |
| 4,888,223 | 12/1989 | Sugimoto et al. | 264/22 |

FOREIGN PATENT DOCUMENTS

| | | |
|---|---|---|
| 3507916 | 9/1896 | Fed. Rep. of Germany . |
| 1504813 | 10/1960 | Fed. Rep. of Germany . |
| 136023 | 6/1979 | German Democratic Rep. . |
| 1190698 | 5/1970 | United Kingdom . |

OTHER PUBLICATIONS

Patent Abstracts of Japan; vol. 7, No. 250 (M-254) (1395) Nov. 8, 1983 & JP-A-58 136 417 (Teijin) Aug. 13, 1983.

Patent Abstracts of Japan; vol. 7, No. 20 (M-188) (1165) Jan. 26, 1983 & JP-A-57 176 125 (Sekisui Kagaku Kogyo) Oct. 29, 1982.

*Primary Examiner*—Jeffery Thurlow
*Assistant Examiner*—Mathieu Vargot
*Attorney, Agent, or Firm*—R. H. Hammer, III

[57] ABSTRACT

The invention relates to the production of ultra thin films. This process involves the biaxial stretching of at least two films wherein the joining of these films has been improved by electric corona discharge treatment.

5 Claims, No Drawings

PROCESS FOR PRODUCING ULTRA THIN THERMOPLASTIC FILMS

FIELD OF THE INVENTION

This invention is related to a process for producing ultra thin thermoplastic films. This process involves the biaxial (i.e., longitudinal and transverse direction) stretching of at least two films wherein joining of the films is improved by the use of an electric corona discharge treatment.

BACKGROUND OF THE INVENTION

Ultra thin films having a thickness of less than 3 μm, particularly less than 1 μm, are required for the production of capacitors used in microelectronics. But, such films are difficult to produce on a large production scale.

Several processes for the production of ultra thin films have been described in the relevant literature. These processes generally utilize the following process steps: producing a thin film together with or on a base film, peeling the thin film off the base film, and then rolling up the thin film.

In British Patent Specification No. 1,190,698, the single films are joined together or adhered by pressure and/or heat. In this process, however, creases in the films are caused by slight thickness variations in the single films. These creases are formed repeatedly and are ironed into the film during the laminating process. The resulting creased thin films are useless for their intended purpose.

In U.S. Pat. Nos. 4,017,227 and 4,076,785, a device for casting two sheets next to each other and then joining those sheets before stretching in transverse direction is described. In this method, however, the supporting function of the base layer is missing and the splitting of the thin film is frequently observed.

In U.S. Pat. Nos. 4,708,905 and 4,756,064, coextruded laminated films, where the individual layers are made of different polymers, are stretched and then delaminated. Problems result from this process because each polymer has a different flow velocity and the velocities cannot be coordinated exactly. Regulating a uniform thickness profile across the film width creates the greatest problem, since allocating thickness distribution of the base film and the coating film is difficult. Additionally, the different polymer layers are subject to casual fluctuations during coextrusion.

SUMMARY OF THE INVENTION

The instant invention is directed to a process for producing ultra thin thermoplastic films. The process includes the following steps: providing a base layer of thermoplastic film; providing a coating layer of thermoplastic film; electric corona discharge treating one surface of either the base layer or coating layer; superimposing the base layer on the coating layer, so that the treated surface is between the layers; biaxially stretching the composite film; delaminating the composite film; and thereby obtaining the ultra thin thermoplastic film.

DETAILED DESCRIPTION OF THE INVENTION

The purpose of the present invention is to provide a process which makes it possible to produce ultra thin thermoplastic films with a thickness ranging from 0.5 to 3 μm and which has a satisfying runnability, a good thickness uniformity, and a good optical quality (for example, luster, cloudiness).

For the purpose of this invention, the term "thermoplastic" shall refer to, but is not limited to, such synthetic polymers as polyolefins, polyesters, polyamides, polysulphones, polyaryletherketones, polyphenylene sulfides, and polystyrene. Most preferred are polyolefins and polyesters.

Exemplary polyolefins include, but are not limited to, isotactic polypropylenes, polyolefin copolymers having propylene units and other alpha-olefins with 2 to 6 C-atoms, and mixtures thereof. Preferred polyolefins include isotactic polypropylenes having a n-heptane soluble portion of not more than 10%, polyolefin copolymers made of propylene and ethylene with an ethylene portion of 2 to 10% by weight, and polyolefin copolymers made of propylene and butylene or 4-methylpentene with a propylene portion of at least 60% by weight.

Exemplary polyesters include homo- and copolycondensates, mixtures of different polyesters, and blends of polyesters with other nonpolyester polymers. Such polyesters include polycondensates made of acida and glycols. The acids include, for example, terephthalic acid, isophthalic acid, or 2,6-naphthalene dicarboxylic acid. The glycols include, for example, those with 2 to 10 carbon atoms. Polyesters such as polyethylene terephthalate, polybutylene terephthalate, poly-1,4-cyclohexylene-dimethylene terephthalate, polyethylene-2,6-naphthalene dicarboxylate, and polyethylene-p-hydroxy-benzoate are preferred according to the invention. These polyesters can be composed of up to 30 mol % of comonomer units whereby a variation in the glycol and/or the acid component is possible. The copolyesters may contain as acid components, among other, adipic acid, glutaric acid, succinic acid, sebacic acid, phthalic acid, iosphthalic acid, 5-Na-sulpho isophthalic acid, or other polyfunctional acids, such as trimellitic acid and the like. Exemplary polyester mixtures include, but are not limited to, polyester-homopolymers, polyester-copolymers, or polyester-homo and copolymers. Exemplary blends include, but are not limited to, polyethylene terephthalate/ polybutylene terephthalate, polyethylene terephthalate/-polyethylene isophthalate, or polyethylene-isophthalate/5-Na-sulpho-isophthalate. Examples of other polymers that may be blended with polyester include, but are not limited to, polyolefin-homo or copolymers such as polyethylene, polypropylene, poly-4-methylpentene, ethylene-vinylacetate-copolymers, which can be saponified on their part, ionomers, polyamides, polyacetones, polycarbonates, polytetrafluoroethylenes, polysulphones, and others.

An exemplary polysulphone is polyarylethersulphone.

The production of ultra thin thermoplastic films according to this invention is accomplished by a process having the following general steps: producing on individual takeoff rolls a base layer and at least one coating layer; treating at least one surface of either the base layer or the coating layer with an electric corona discharge; and superimposing the base layer on the coating layer in such a way that the corona treated surface is placed between the layers. Additionally, the following steps are also necessary for the production of the ultra thin films: biaxially stretching the composite film (i.e. the superimposed base and coating layers), and delaminating the composite film.

Preferably, the base layer comprises a polyolefin film and the coating layer comprises a polyester film. Each layer, i.e., the base layer and the coating layer, are produced separately in any conventional manner.

The electric corona discharge is done with sparking electrodes which are connected to a high-frequency generator. A voltage of about 10,000 V and a frequency of about 10,000 Hz are suitable. In the present invention preferably the surface of the base layer (e.g. the polyolefin film) is corona treated, so that the corona treated surface has a surface tension of at least 40 mN/m after the treatment.

Thereafter, the base layer and the coating layer are superimposed upon one another in any conventional manner, so that the electric corona discharge treated surface is between the base and coating layers. Thereafter, this composite web (i.e. the joined base and coating layers) is biaxially stretched in a known manner until the coating layer has a thickness less than 3 μm. Then, the composite web is delaminated, in a known manner, into the base layer and the ultra thin coating layer. And each layer is taken up separately.

Surprisingly enough, it turned out that ultra thin films made of polyester could be produced, according to the above mentioned process, with a thickness ranging from 0.5 to 3 μm, particularly from 1 to 2 μm, with very good runnability, and with an excellent thickness profile. In addition, these ultra thin films have a very high luster and a very slight cloudiness.

The invention shall be illustrated in greater detail by the following example. In the example, the instant invention is compared to the above mentioned prior art.

In the example, the optical quality, that is luster and cloudiness values, is determined in the following manner.

Luster is determined according to DIN 67 530. The reflector value is measured as optical property for the surface of the film. In accordance with standards set forth in ASTM-D 523-78 and ISO 2813, the angle of incidence was set at 20°. A ray of light hits the level testing area with the adjusted angle of incidence and is reflected and/or scattered. The rays of light falling onto the photoelectronic receiver are shown as proportional electric property. The measurement is non-dimensional and has to be stated with the angle of incidence.

The cloudiness of the film is measured in accordance with ASTM-D 1003-52 whereby a 1 slot diaphragm is used instead of a 4° pinhole diaphragm and cloudiness is given in percent for four superimposed film layers. The four layers were chosen since the optimal measuring range is utilized hereby.

EXAMPLE

Polyethylene terephthalate was extruded from a flat slot die and chilled on a takeoff roll to a cast sheet with a thickness of 10.5 μm.

A mixture of 90% by weight of polypropylene and 10% by weight of TAFMER XR ® (available from Mitsui Petrochemical), a mixture made of an ethylene-propylene-butylene-terpolymer and a ethylene-butylene-copolymer, was extruded from a second flat slot die and chilled on a takeoff roll to a cast sheet with a thickness of 52.5 μm.

The polyolefin film was then passed through an electric corona discharge zone (10,000 Hz/10,000 V) and displayed, after the treatment, a surface tension of 42 mN/m on the treated surface.

Both films were then joined whereby the corona treated surface was placed between the two film layers. The film composite was then stretched to three times its size in longitudinal direction at a temperature of 95° C. with rolls driven with different surface speed, then placed into a transverse stretching tenter and stretched to 3.5 times its size in transverse direction at a temperature of 95° C.

The film composite was then cooled and delaminated producing a polyester film with a 1 μm thickness and polyolefin film with a 5 μm thickness.

The results of the comparative tests (Table 1) show clearly the superiority of the process in the present invention.

TABLE 1

| (comparison with prior art) | | | |
|---|---|---|---|
| British Specification No. 1,190,698 | U.S. Pat. Nos. 4,017,227 or 4,076,785 | U.S. Pat. Nos. 4,708,905 or 4,756,064 | process of present invention |

| | British Spec. | U.S. Pat. 4,017/4,076 | U.S. Pat. 4,708/4,756 | present invention |
|---|---|---|---|---|
| reliability of process* | + | − | + | + |
| gauge uniformity* | + | + | − | + |
| optical quality* | − | + | +− | + |
| delaminability* | − | − | +− | + |

*in each case related to the thin film
+ = good
+− = satisfactory
− = poor

I claim

1. A process for the production of ultra thin thermoplastic films comprising the steps of:
   providing a base layer of thermoplastic film;
   providing an ultra thin coating layer of thermoplastic film;
   electric corona discharge treating one surface of either the base layer or coating layer;
   superimposing the base layer on the coating layer, so that the electric corona discharge treated surface is between the base layer and the coating layer, and thereby forming a composite film;
   biaxially stretching the composite film; and
   delaminating the composite film into the base layer and ultra thin coating layer, which ultra thin coating layer represents the ultra thin thermoplastic film.

2. The process according to claim 1 further comprising the step of:
   obtaining the electric corona discharge treating by providing sparking electrodes connected to a high frequency generator, the generator and electrodes being capable of treating the surface so that the surface obtains a surface tension of at least 40 mN/m after treating.

3. The process according to claim 1 further comprising the step of:
   providing a base layer of thermoplastic film, the base layer being a polyolefin film; and
   providing a coating layer of thermoplastic film, the coating layer being a polyester film.

4. The process according to claim 1 further comprising the step of:
   obtaining said ultra thin thermoplastic film, said ultra thin thermoplastic film having a thickness ranging from about 0.5 to about 3.0 μm.

5. The process according to claim 4 further comprising the step of:
   obtaining said ultra thin thermoplastic film, said ultra thin thermoplastic film having a thickness ranging from about 1 to about 2 μm.

* * * * *